US009904605B2

(12) United States Patent
Bryant et al.

(10) Patent No.: US 9,904,605 B2
(45) **Date of Patent: *Feb. 27, 2018**

(54) SYSTEM AND METHOD FOR ENHANCING AVAILABILITY OF A DISTRIBUTED OBJECT STORAGE SYSTEM DURING A PARTIAL DATABASE OUTAGE

(71) Applicant: HITACHI DATA SYSTEMS CORPORATION, Santa Clara, CA (US)

(72) Inventors: Alan G. Bryant, Walpole, MA (US); Kevin S. Grimaldi, Roslindale, MA (US); Trek Palmer, Cambridge, MA (US); David B. Pinkney, Andover, MA (US)

(73) Assignee: HITACHI DATA SYSTEMS CORPORATION, Santa Clara, CA (US)

(*) Notice: Subject to any disclaimer, the term of this patent is extended or adjusted under 35 U.S.C. 154(b) by 108 days.

This patent is subject to a terminal disclaimer.

(21) Appl. No.: 14/930,751

(22) Filed: Nov. 3, 2015

(65) Prior Publication Data

US 2016/0070622 A1 Mar. 10, 2016

Related U.S. Application Data

(63) Continuation of application No. 13/924,666, filed on Jun. 24, 2013, now Pat. No. 9,183,096, which is a (Continued)

(51) Int. Cl.
*G06F 17/30* (2006.01)
*G06F 11/20* (2006.01)
(Continued)

(52) U.S. Cl.
CPC .......... *G06F 11/1464* (2013.01); *G06F 3/065* (2013.01); *G06F 3/067* (2013.01);
(Continued)

(58) Field of Classification Search
CPC .. G06F 11/1464; G06F 3/065; G06F 11/1451; G06F 3/067; G06F 11/1662;
(Continued)

(56) References Cited

U.S. PATENT DOCUMENTS

| | | | |
|---|---|---|---|
| 2006/0026219 | A1 | 2/2006 | Orenstein et al. |
| 2006/0077724 | A1 | 4/2006 | Chikusa et al. |
| 2006/0129875 | A1 | 6/2006 | Barrall |

*Primary Examiner* — Albert Phillips, III
(74) *Attorney, Agent, or Firm* — Mattingly & Malur, PC

(57) ABSTRACT

An "operate with missing region" feature allows a cluster to continue servicing reads for available regions even when some regions are missing. Upon a given node failure condition, the cluster is placed in an effective read-only mode for all regions. The node failure condition typically is one where there has been a failure of an authoritative region copy and no backup copy is then available. Typically, "read-only" means no client write or update requests succeed while the cluster is in this state. Those requests should fail with an error message that indicates failure because of the read-only status. Preferably, such requests are re-tried. In this mode, regions are only allowed to perform read operations but the cluster continues to operate with missing regions, and missing regions are entered on a region map. The cluster then automatically recovers returning missing regions, after which it leaves the read-only state.

17 Claims, 9 Drawing Sheets

Related U.S. Application Data continuation of application No. 12/889,762, filed on Sep. 24, 2010, now Pat. No. 8,515,915.

(51) Int. Cl.

| | |
|---|---|
| ***G06F 11/16*** | (2006.01) |
| ***G06F 11/14*** | (2006.01) |
| ***G06F 3/06*** | (2006.01) |

(52) U.S. Cl.

CPC .......... *G06F 3/0619* (2013.01); *G06F 11/143* (2013.01); *G06F 11/1425* (2013.01); *G06F 11/1435* (2013.01); *G06F 11/1451* (2013.01); *G06F 11/1662* (2013.01); *G06F 11/2094* (2013.01); *G06F 2201/80* (2013.01); *G06F 2201/84* (2013.01)

(58) Field of Classification Search

CPC ............... G06F 11/1425; G06F 11/143; G06F 11/2094; G06F 2201/80; G06F 2201/84; G06F 11/1435; G06F 3/0619

See application file for complete search history.

| REGION | AUTHORITATIVE | BACKUP 1 | BACKUP 2 |
|---|---|---|---|
| 0 | n1 | n2 | n3 |
| 1 | n2 | n3 | n4 |
| 2 | n3 | n4 | n1 |
| 3 | n4 | n1 | n2 |
| 4 | n1 | n2 | n3 |
| • • • | • • • | • • • | • • • |
| 63 | n4 | n1 | n2 |

| EVENT | | NODE 1 REBOOTS, THE A COPY IS LOST | MAP INSTALL | B COPY ON NODE 3 PROMOTED TO A. I COPY STARTED ON NODE 7 | NODE 3 REBOOTS, B NOT YET AVAILABLE, A IS LOST | MAP INSTALL | FAILED MAP: NO REGION 7. CLUSTER UNAVAILABLE (OFFLINE) |
|---|---|---|---|---|---|---|---|
| NODE 1 | A | X | X | X | X | X | X |
| NODE 3 | B | B | B | A | X | X | X |
| NODE 5 | -- | -- | -- | -- | -- | -- | -- |
| NODE 7 | -- | -- | -- | I | I | I | -- |

*FIG. 7*

| NODE | REGIONS | |
|---|---|---|
| 1 | 3/00 A | |
| | 3/01 A | |
| | 3/03 B | |
| | 3/06 B | |

| NODE | REGIONS | |
|---|---|---|
| 1 | 3/00 A | |
| | 3/01 A | |
| | 3/03 B | |
| | 3/06 A | 3/07 I |

| NODE | REGIONS | |
|---|---|---|
| 1 | 3/00 A | |
| | 3/01 A | |
| | 3/03 B | |
| | 3/06 A | 3/07 I |

| NODE | REGIONS | |
|---|---|---|
| 2 | 3/02 A | |
| | 3/03 A | |
| | 3/00 B | |
| | 3/04 B | |

| NODE | REGIONS | |
|---|---|---|
| 2 | 3/02 A | |
| | 3/03 A | |
| | 3/00 B | 3/05 I |
| | 3/04 B | 3/06 I |

| NODE | REGIONS | |
|---|---|---|
| 2 | 3/02 A | |
| | 3/03 A | |
| | 3/00 B | 3/05 I |
| | 3/04 B | 3/06 I |

| NODE | REGIONS | |
|---|---|---|
| 3 | 3/04 A | |
| | 3/05 A | |
| | 3/01 B | |
| | 3/07 B | |

| NODE | REGIONS | |
|---|---|---|
| 3 | 3/04 A | |
| | 3/05 A | |
| | 3/01 B | |
| | 3/07 A | |

| NODE | REGIONS | |
|---|---|---|
| 3 | 3/04 A | |
| | 3/05 A | |
| | 3/01 B | |
| | 3/07 A | |

| NODE | REGIONS | |
|---|---|---|
| 4 | 3/06 A | |
| | 3/07 A | |
| | 3/02 B | |
| | 3/05 B | |

| NODE | REGIONS | |
|---|---|---|
| 4 | 3/06 A | |
| | 3/07 A | |
| | 3/02 B | |
| | 3/05 B | |

| NODE | REGIONS | |
|---|---|---|
| 4 | 3/06 A | |
| | 3/07 A | |
| | 3/02 B | |
| | 3/05 B | |

*FIG. 8*

| EVENT | | NODE 1 REBOOTS | MAP INSTALL | B COPY ON NODE 3 PROMOTED TO A | NODE 4 REBOOTS | MAP INSTALL | REGION 7 UNAVAILABLE (PROXIED) CLUSTER READ-ONLY |
|---|---|---|---|---|---|---|---|
| NODE 1 | A | X | X | X | X | X | X |
| NODE 3 | B | B | B | A | X | X | A* |
| NODE 5 | -- | -- | -- | -- | -- | -- | -- |
| NODE 7 | -- | -- | -- | I | I | I | -- |

*FIG. 9*

STOP ACCEPTING WRITES; HONOR READS:

| NODE | REGIONS | |
|---|---|---|
| 1 | 3/00 A | |
| | 3/01 A | |
| | 3/03 B | |
| | 3/06 B | |

| NODE | REGIONS | |
|---|---|---|
| 1 | 3/00 A | |
| | 3/01 A | |
| | 3/03 B | |
| | 3/06 A | 3/07 I |

| NODE | REGIONS | |
|---|---|---|
| 1 | 3/00 A | |
| | 3/01 A | |
| | 3/03 B | |
| | 3/06 A | |

| NODE | REGIONS | |
|---|---|---|
| 2 | 3/02 A | |
| | 3/03 A | |
| | 3/00 B | |
| | 3/04 B | |

| NODE | REGIONS | |
|---|---|---|
| 2 | 3/02 A | |
| | 3/03 A | |
| | 3/00 B | 3/05 I |
| | 3/04 B | 3/06 I |

| NODE | REGIONS | |
|---|---|---|
| 2 | 3/02 A | |
| | 3/03 A | |
| | 3/00 B | 3/05 I |
| | 3/04 B | 3/06 I |

| NODE | REGIONS | |
|---|---|---|
| 3 | 3/04 A | |
| | 3/05 A | |
| | 3/01 B | |
| | 3/07 B | |

| NODE | REGIONS | |
|---|---|---|
| 3 | 3/04 A | |
| | 3/05 A | |
| | 3/01 B | |
| | 3/07 A | |

| NODE | REGIONS | |
|---|---|---|
| 3 | 3/04 A | |
| | 3/05 A | |
| | 3/01 B | |
| | 3/07 A | |

| NODE | REGIONS | |
|---|---|---|
| 4 | 3/06 A | |
| | 3/07 A | |
| | 3/02 B | |
| | 3/05 B | |

| NODE | REGIONS | |
|---|---|---|
| 4 | 3/06 A | |
| | 3/07 A | |
| | 3/02 B | |
| | 3/05 B | |

| NODE | REGIONS | |
|---|---|---|
| 4 | 3/06 A | |
| | 3/07 A | |
| | 3/02 B | |
| | 3/05 B | |

*FIG. 11*

SYSTEM AND METHOD FOR ENHANCING AVAILABILITY OF A DISTRIBUTED OBJECT STORAGE SYSTEM DURING A PARTIAL DATABASE OUTAGE

BACKGROUND OF THE INVENTION

Technical Field

This disclosure relates generally to techniques for highly available, reliable, and persistent data storage in a distributed computer network.

Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

Known prior art archival storage systems typically store metadata for each file as well as its content. Metadata is a component of data that describes the data. Metadata typically describes the content, quality, condition, and other characteristics of the actual data being stored in the system. In the context of distributed storage, metadata about a file includes, for example, the name of the file, where pieces of the file are stored, the file's creation date, retention data, and the like. While reliable file storage is necessary to achieve storage system reliability and availability of files, the integrity of metadata also is an important part of the system. In the prior art, however, it has not been possible to distribute metadata across a distributed system of potentially unreliable nodes. The present invention addresses this need in the art.

An improved archival storage system is described in U.S. Pat. Nos. 7,155,466, 7,657,581 and 7,657,586, which are commonly-owned. This system provides a distributed object store across a distributed set of nodes. According to U.S. Pat. No. 7,657,581, an archival storage cluster of symmetric nodes includes a "metadata management" system that organizes and provides access to metadata, preferably in the form of metadata objects. Each metadata object has a unique name, and metadata objects are organized into regions. In one embodiment, a region is selected by hashing one or more object attributes (e.g., the object's name) and extracting a given number of bits of the resulting hash value. The number of bits may be controlled by a configuration parameter. In this scheme, each region is stored redundantly, and a region comprises a set of region copies. In particular, there is one authoritative copy of the region, and zero or more backup copies. As described, the number of copies may be controlled by a configuration parameter, sometimes referred to as a number of metadata protection levels (a "MDPL"). Thus, for example, in one embodiment of this scheme, a region comprises an authoritative region copy and its MDPL-1 backup copies. Region copies are distributed across the nodes of the cluster so as to balance the number of authoritative region copies per node, as well as the number of total region copies per node.

Another aspect of the above-described metadata manager system is referred to as a region "map" that identifies the node responsible for each copy of each region. The region map is accessible by the processes that comprise the metadata management system. A region in the region map represents a set of hash values, and the set of all regions covers all possible hash values. The regions are identified by a number, which is derived by extracting a number of bits of a hash value. A namespace partitioning scheme is used to define the regions in the region map and to control ownership of a given region. This partitioning scheme is implemented in a database. In the scheme, a region copy has one of three states: "authoritative," "backup" and "incomplete." If the region copy is authoritative, all requests to the region go to this copy, and there is one authoritative copy for each region. If the region copy is a backup (or an incomplete), the copy receives update requests (from an authoritative region manager process). A region copy is incomplete if metadata is being loaded but the copy is not yet synchronized (typically, with respect to the authoritative region copy). An incomplete region copy is not eligible for promotion to another state until synchronization is complete, at which point the copy becomes a backup copy.

Another aspect of the above-described metadata management scheme is that the backup region copy is kept synchronized with the authoritative region copy. Synchronization is guaranteed by enforcing a protocol or "contract" between an authoritative region copy and its MDPL-1 backup copies when an update request is being processed. For example, after committing an update locally, the authoritative region manager process issues an update request to each of its MDPL-1 backup copies (which, typically, are located on other nodes). Upon receipt of the update request, in this usual course, a region manager process associated with a given backup copy issues, or attempts to issue, an acknowledgement. The authoritative region manager process waits for acknowledgements from all of the MDPL-1 backup copies before providing an indication that the update has been successful. There are several ways, however, in which this update process can fail, e.g., the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. If the backup region manager cannot process the update, it removes itself from service. If either the backup region manager process or the authoritative manager process dies, a new region map is issued. By ensuring synchronization in this manner, each backup copy is a "hot standby" for the authoritative copy. Such a backup copy is eligible for promotion to being the authoritative copy, which may be needed if the authoritative region copy is lost, or because load balancing requirements dictate that the current authoritative region copy should be demoted (and some backup region copy promoted).

When all nodes are running and all storage is available in the cluster for each region, there is one authoritative copy, and MDPL-1 backup copies. If an outage in the cluster occurs that causes a region's authoritative copy to be lost, the map is reconstructed and an existing backup copy is promoted to the new authoritative copy. When additional outages occur, however, it is possible that a region's backup copy is also lost, leaving no region copy to promote. When all authoritative and backup copies are lost, the region is considered missing, and data managed by that region becomes inaccessible.

Thus, clusters undergoing multi-node outages present availability concerns. A multi-node outage can result in a cluster that is above quorum but is missing metadata for one or more regions.

BRIEF SUMMARY

An "operate with missing region" feature of this disclosure allows the cluster to continue servicing client reads for available regions even when some regions are missing. In particular, upon a given node failure condition, the cluster is placed in an effective read-only mode for all regions. The node failure condition typically is one where there has been a failure of an authoritative region copy and no backup copy is then available. As used herein, "read-only" means that no client write or update requests will succeed while the cluster is in this state. In particular, those requests fail with an error message (or the like) that indicates failure because of the read-only status. Preferably, such requests are then re-tried. In this mode, all regions are only allowed to perform read operations. During the read-only state, the cluster continues to operate with missing regions, and missing regions are entered on the region map. The cluster then automatically recovers returning missing region(s), after which is leaves the read-only state.

The foregoing has outlined some of the more pertinent features of this disclosure. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of this subject matter and the advantages thereof, reference is now made to the following descriptions taken in conjunction with the accompanying drawings, in which:

FIG. 7 is a table that illustrates an 8 node cluster with MDPL=2 when two nodes become unavailable prior to the teachings herein;

FIG. 8 illustrates the impact of a double node failure on the cluster described in the table of FIG. 7;

FIG. 9 is a table that illustrates an 8 node cluster with MDPL=2 when two nodes are lost but with the enhanced availability feature of this disclosure;

FIG. 11 illustrates the impact of the double node failure on the cluster described in the table of FIG. 9 but shows how the storage system continues to honor read requests outside the missing regions according to the teachings herein.

DETAILED DESCRIPTION OF AN ILLUSTRATIVE EMBODIMENT

Figure 1:
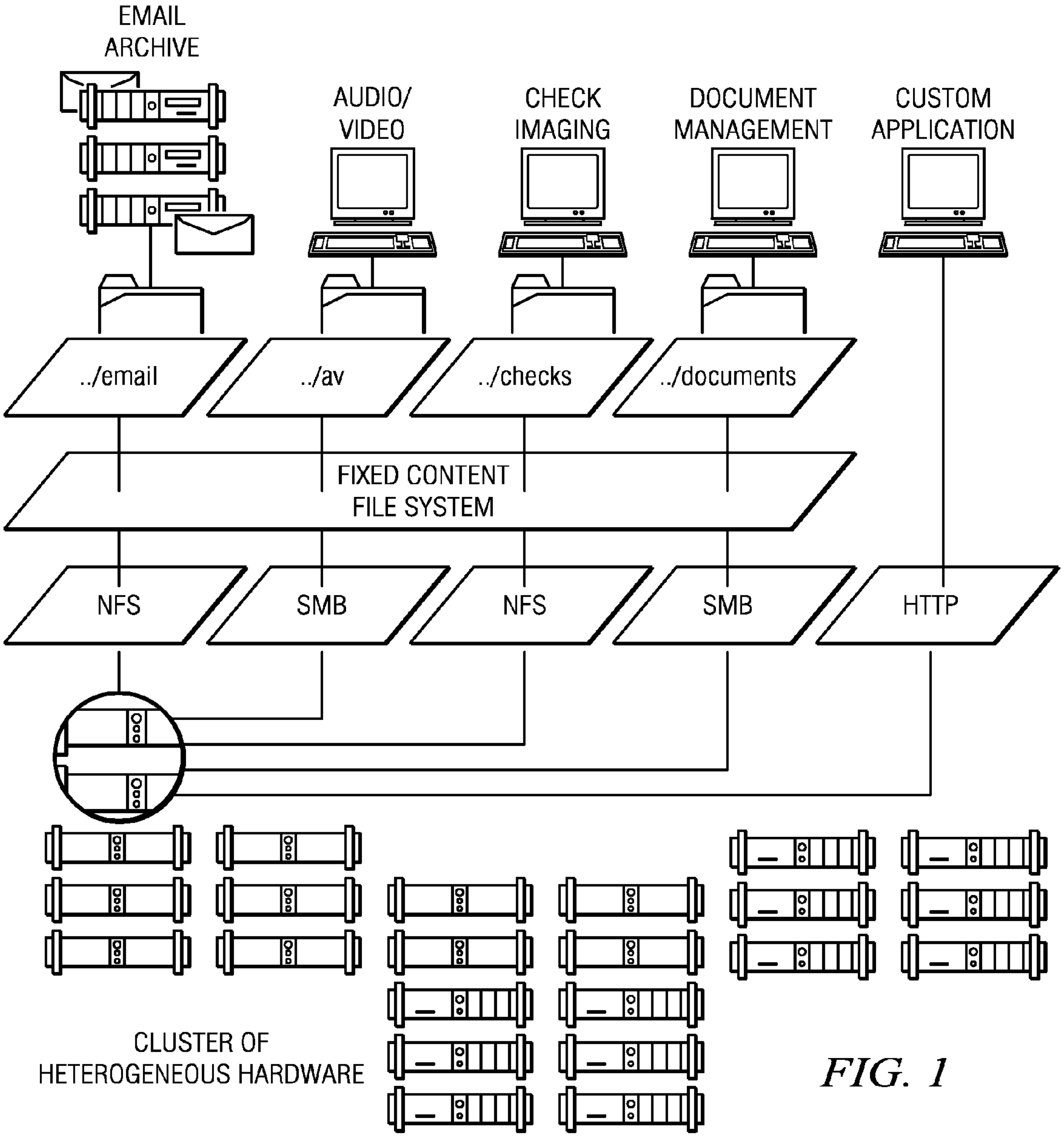
FIG. 1 is a simplified block diagram of a fixed content storage archive in which the subject matter herein may be implemented.

The techniques described below preferably are implemented in a scalable disk-based archival storage management system, preferably a system architecture based on a redundant array of independent nodes. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. In one illustrative embodiment, the software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
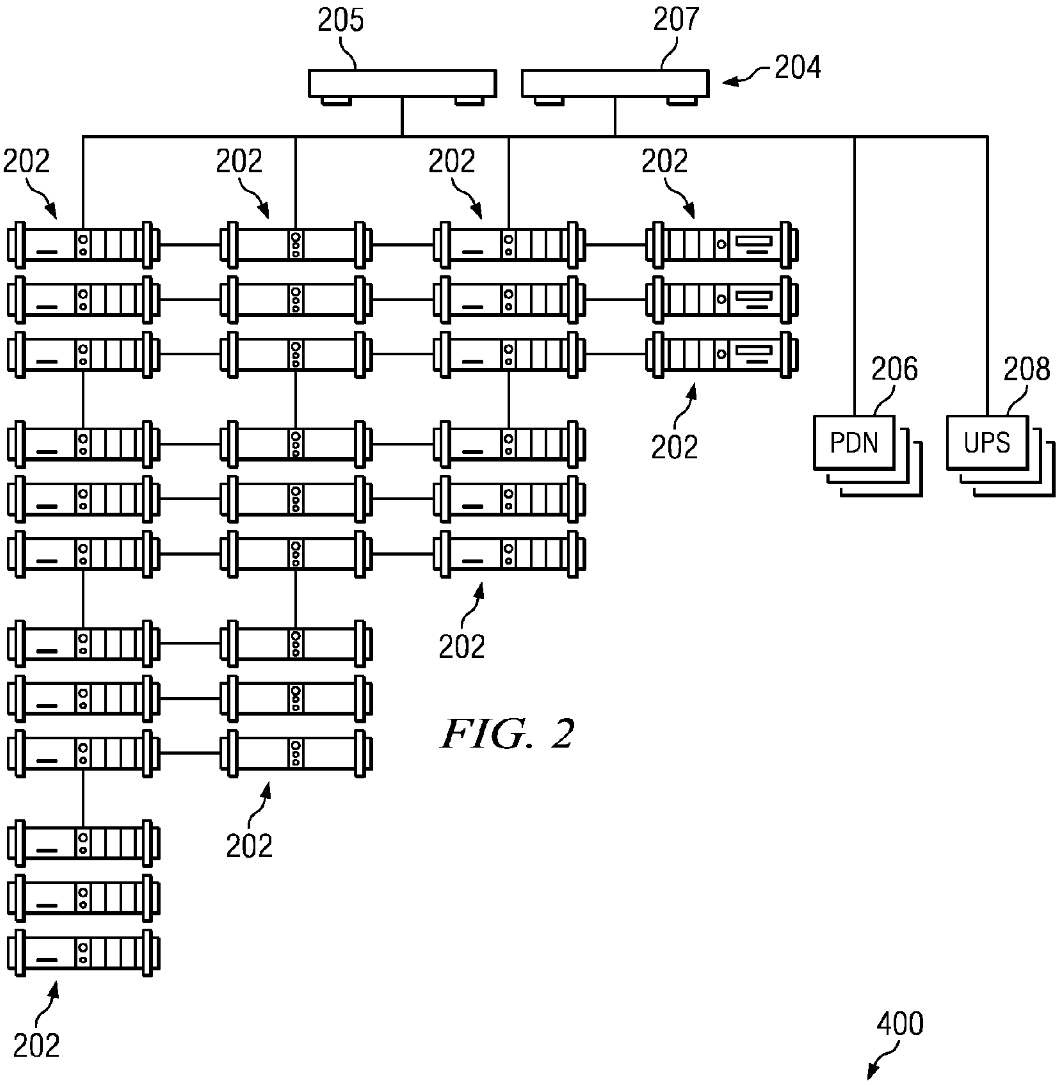
FIG. 2 is a simplified representation of a redundant array of independent nodes each of which is symmetric and supports an archive cluster application.

As described in commonly-owned U.S. Pat. Nos. 7,155,466, 7,657,581 and 7,657,586, a distributed software application executed on each node captures, preserves, manages, and retrieves digital assets. In an illustrated embodiment of FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements. Preferably, data is replicated across the cluster so that the archive is always protected from device failure. If a disk or node fails, the cluster automatically fails over to other nodes in the cluster that maintain replicas of the same data.

An illustrative cluster preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an (I)nternal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directory structures.

Figure 3:
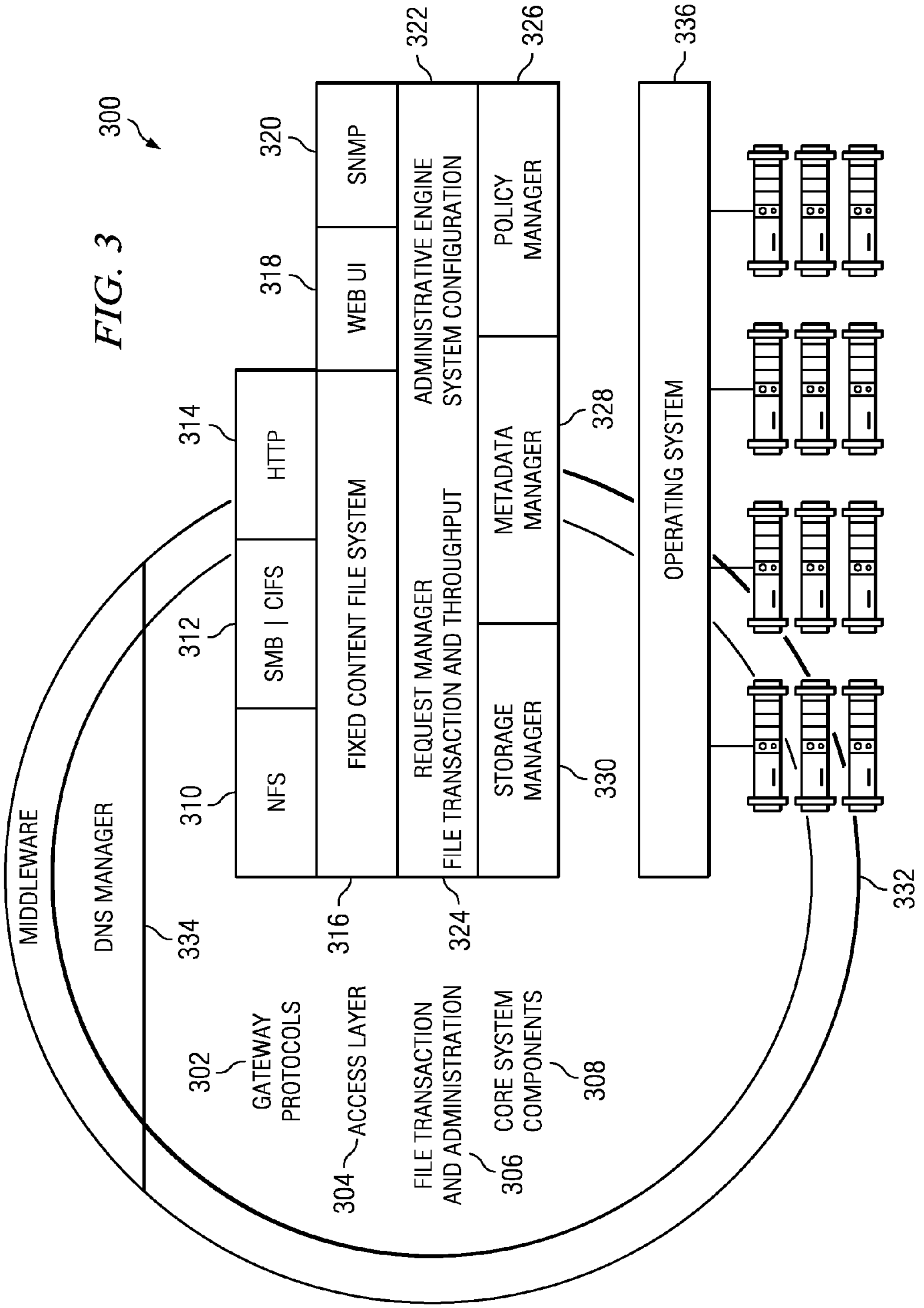
FIG. 3 is a high level representation of the various components of the archive cluster application executing on a given node.

As illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0. The communications middleware is any convenient distributed communication mechanism. Other components may include FUSE (Filesystem in USErspace), which may be used for the Fixed Content File System (FCFS) 316. The NFS gateway 310 may be implemented by Unfsd, which is a user space implementation of the standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the internal File), EF Protection representation (EF protection mode), IF protection role (representation of this internal file), EF Creation timestamp (external file timestamp), Signature (signature of the internal file at the time of the write (PUT), including a signature type) and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

As noted above, internal files preferably are the "chunks" of data representing a portion of the original "file" in the archive object, and preferably they are placed on different nodes to achieve striping and protection blocks. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files.

Metadata Management

As described in U.S. Pat. No. 7,657,581, the disclosure of which is incorporated herein by reference, metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment, the metadata management system provides persistence for a set of metadata objects, which may include one or more of the following object types:

ExternalFile: a file as perceived by a user of the archive;

InternalFile: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g. number of files) at a point in time; and PolicyState: a violation of some policy.

Each metadata object may have a unique name that preferably never changes. According to the technique described in the above-identified patent, metadata objects are organized into regions. A region comprises an authoritative region copy and a Metadata Protection Level (MDPL) number (a set of zero or more) backup region copies. With zero copies, the metadata management system is scalable but may not be highly available. A region is selected by hashing one or more object attributes (e.g., the object's name, such as a fully-qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme, as described below.

As described in U.S. Pat. No. 7,657,581, each region may be stored redundantly. As noted above, there is one authoritative copy of the region, and zero or more backup copies. The number of backup copies is controlled by the Metadata Data Protection Level (or "MDPL") configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object. While Postgres is a preferred database, any convenient relational database (e.g., Oracle, IBM DB/2, or the like) may be used.

Figure 4:
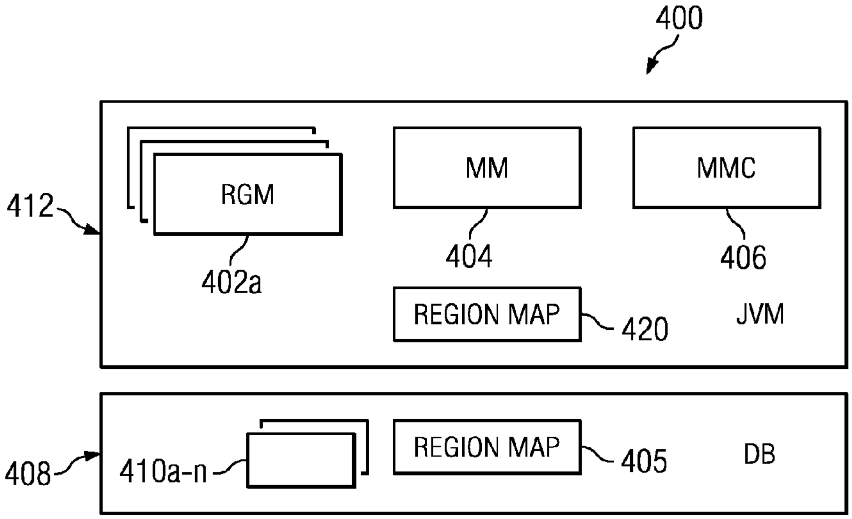
FIG. 4 illustrates components of the metadata management system on a given node of the cluster.

As illustrated in FIG. 4, each node 400 has a set of processes or components: one or more region managers (RGM) 402*a-n*, a metadata manager (MM) 404, at least one metadata manager client (MMC) 406, and a database 408 having one or more schemas 410*a-n*. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. According to the disclosure in the above-identified patent, each node preferably has the same global view of the region map, which requirement is enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. A given metadata manager (in a given node) acts as a leader (an MML) and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an uinteger between 0x0 and 0x3fffffff inclusive, i.e. 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, according to the above-identified patent, a region copy is in one of three (3) states: "authoritative" (A), "backup" (B) and "incomplete" (I). If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the MDPL configuration parameter) backup or incomplete copies.

As described in U.S. Pat. No. 7,657,581, a backup region copy is kept synchronized with the authoritative region copy by enforcing a protocol (or "contract") between an authoritative region copy and its MDPL backup copies. This protocol is now described.

Figures 5, 6:
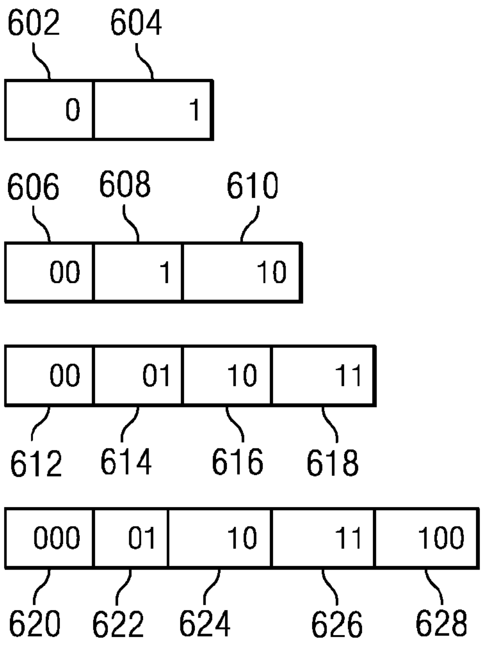
FIG. 5 is an illustrative region map.
FIG. 6 illustrates how a namespace partitioning scheme is used to facilitate region map changes as the cluster grows in size.

As has been described, the region map describes the ownership of each copy of each region. For example, FIG. 5 illustrates a region map for a 4-node cluster with metadataMDPL=2. In this example, node 1 is authoritative for region 0, and nodes 2 and 3 have been designated as backups, node 2 is authoritative for region 1, and nodes 3 and 4 have been designated as backups; and so on, as indicated. A namespace partitioning scheme may be used to change control (ownership) of a particular region as the cluster grows. One way to allow dynamic growth is to increment the regionMapLevel configuration parameter that determines the number of bits that comprise the hash value number. As the cluster grows, one or more partitions of the region map undergo a "split" operation. Splitting involves using one more bit of the hash value and redistributing metadata accordingly. For example, consider a map at level 6, and two metadata objects with hash values 0x1000002a and 0x1000006a. The last 6 bits of these hash values (hex 0x2a, with "2" being binary "0010" and "6" being binary "0110") are the same; thus, both objects fall into region 0x2a. If the map level is then increased to 7, then the regions are 0 through 0x7f, thus forcing the two objects to go into different regions, namely, 0x2a and 0x6a.

While this approach may be used, it requires every region to be split at the same time. A better technique is to split regions incrementally. To do this, the namespace partitioning scheme splits regions in order, starting at region 0 and ending at the last region of the current level. A region is split by using one more bit of the hash value. FIG. 6 illustrates this process. In this example, assume that at a map level 1 there are two regions 602 (node 0) and 604 (node 1). The nodes numbers are shown in binary. When the map needs to grow, the partitioning scheme splits region 0 by using one more bit of the hash value. This creates three regions 606, 608 and 610. The objects whose new bit is zero stay where they are in region 606 (node 00), and the remaining objects go to a new last region 610 (node 10). The bits added due to the split are italicized, namely: 00 and 10. It should be noted that the first and last regions 606 and 610 use two bits, while the middle (unsplit) region uses just one; yet, the numbering scheme still works correctly, namely, {0, 1, 2}, when viewed from left to right. For further growth, region 1 is split to create four regions 612 (node 00), 614 (node 01), 616 (node 10) and 618 (node 11). This completes level 2. When the region map needs to grow again, the scheme splits region 00 to 000 (i.e., by adding one more bit of the hash value) and adds a new region 100 (also by adding one more bit of the hash value), at the end. The region map then has five regions 620, 622, 624, 626 and 628 as shown.

There is no requirement that the number of regions correspond to the number of nodes. More generally, the number of regions is uncorrelated with the number of nodes in the array of independent nodes.

Thus, according to one embodiment, control over regions is accomplished by assigning metadata objects to regions and then splitting regions incrementally. The region copies (whether authoritative, backup or incomplete) are stored in the database on each node. As has been described, metadata operations are carried out by authoritative RGMs. When a node fails, however, some number of region copies will be lost. As has been described, availability is restored by promoting one of the backup copies of the region to be authoritative, which can usually be done in a few seconds. During the short interval in which the backup is promoted, requests submitted by an MMC to the region will fail. This failure shows up as an exception caught by the MMC, which, after a delay, causes a retry. By the time the request is retried, however, an updated map should be in place, resulting in uninterrupted service to MMC users. As has been described, this approach relies on copies (preferably all of them) of a region staying synchronized.

The following provides additional implementation details of the metadata management system.

As mentioned above, the MM leader creates a region map when a node leaves the cluster, when a node joins the cluster, or when an incomplete region copy completes loading. In the first case, when a node leaves a cluster, either temporarily or permanently, the regions managed by the MM on that node have to be reassigned. The second case involves the situation when a node returns to service, or when a node joins the cluster for the first time; in such case, regions are assigned to it to lighten the load for the other MMs in the cluster. All the regions created on the new node are incomplete. These regions are promoted to be backups once they have finished loading data. The third situation occurs when an incomplete region completes loading its data. At this time, the region becomes a backup. A map creation algorithm preferably ensures that a given node never contains more than one copy of any region, that authoritative regions are balanced across the cluster, and that all regions are balanced across the cluster. The latter two constraints are necessary, as all RGMs process every metadata update and thus should be spread across the cluster. Authoritative RGMs also process retrieval requests, so they should also be well-distributed.

The following provides additional details regarding a map creation algorithm.

When a MM leader needs to create a new map, the first thing it does is a region census. This is done using the request/response message pattern, sending the request to the MM on each node currently in the cluster. The request/response pattern preferably includes an aggregation step in which all responses are combined, forming a complete picture of what regions exist in the archive. The information provided by the region census preferably includes the following, for each region copy: the node owning the region copy, the last update processed by the region manager (if any), and the region timestamp stored in the region's database schema. The region timestamps are used to identify obsolete regions, which are deleted from the census. This guarantees that obsolete regions will be left out of the map being formed, and also that the obsolete region schemas will be deleted. In most cases, an obsolete region copy will have a lower map version number than the map number from a current region copy. This may not always be the case, however. Assume, for example, that a new map is being created due to a node crash. The region census discovers the remaining regions and forms a new map. If the failed node restarts in time to respond to the region census, the node will report its regions as if nothing had gone wrong. However, these regions may all be out of date due to updates missed while the node was down. The solution to this problem is to examine the region timestamps included with the region census. Each region copy reports its region timestamp, which represents the timestamp of the last update processed. Because region copies are kept synchronized, valid timestamps must take into account map version changes and initial maps. This identifies obsolete regions, whether the failed region has a current or obsolete map version number. There is no danger that a node will fail, return to service quickly, and then start processing requests based on obsolete regions. The reason for this is that the node will not have a region map on reboot, and RGMs do not exist until the map is received. Requests from an MMC cannot be processed until RGMs are created. So a failed node, which restarts quickly, cannot process requests until it gets a new map, and the new map will cause the node to discard its old regions.

After the region census, an initial region map is generated as follows. If the region census turns up no regions at all, then the cluster must be starting for the first time. In this case, authoritative region owners are assigned first. For each assignment, the algorithm selects a least busy node. The least busy node is the node with the fewest region copies. Ties are resolved based on the number of authoritative copies owned. After authoritative region owners are assigned, backup region owners are assigned, striving to balanced authoritative and total region ownership. The new map is sent to all MMs, which then create the regions described by the map.

Once the cluster has started, map changes preferably are implemented by doing the following map transformations, in order: (1) if a region does not have an authoritative copy (due to a node failure), promote a backup; (2) if a region has more than MDPL backups, delete excess backups; (3) if a region has fewer than MDPL backups, (due to a node failure, or due to a promotion to authoritative), create a new incomplete region copy; (4) rebalance ownership; and (5) rebalance authoritative ownership. Step (4) involves finding the busiest node and reassigning one of its regions to a node whose ownership count is at least two lower. (If the target node's ownership count is one lower, then the reassignment does not help balance the workload.) Preferably, this is done by creating a new incomplete region. This operation is continued as long as it keeps reducing the maximum number of regions owned by any node. Step (5) involves finding the node owning the largest number of authoritative regions, and finding a backup whose authoritative ownership count is at least two lower. This step swaps responsibilities, e.g., by promoting the backup and demoting the authoritative. This operation is continued as long as it keeps reducing the maximum number of authoritative regions owned by any node.

When a node leaves the cluster, then steps (1) and (3) fill any gaps in the region map left by the node's departure. Steps (4) and (5) are then used to even out the workload, if necessary.

When a node joins the cluster, steps (1)-(3) do not change anything. Step (4), in contrast, results in a set of incomplete regions being assigned to the new node. When an incomplete region completes loading its data, it notifies the MM leader. The map promotes the incomplete region to a backup. Step (5) then has the effect of assigning authoritative regions to the new node.

When an incomplete region finishes its synchronization, it converts to a backup region and informs the MM leader. The MM leader then issues a new map, containing more than TPOF backups for at least one region. Step (2) deletes excess backup regions, opting to lighten the burden on the most heavily loaded MMs.

When a MM receives a new map, it needs to compare the new map to the current one, and for each region managed by the MM, apply any changes. The possible changes are as follows: delete a region, create a region, promote a backup region to authoritative, promote an incomplete region to backup, and demote an authoritative region to backup. Regarding the first type of change, load balancing can move control of a region copy from one node to another, resulting in deletion of a copy. In such case, the network and database resources are returned, including the deletion of the schema storing the region's data. The second type of change, creating a region, typically occurs in a new cluster as authoritative and backup regions are created. Thereafter, only incomplete regions are created. Region creation involves creating a database schema containing a table for each type of metadata object. Each region's schema contains information identifying the role of the region (authoritative, backup or incomplete). The third type of change, promotion from backup to authoritative, requires modification of the region's role. The other change types, as their names imply, involve changing the region's role from incomplete to backup, or from authoritative to backup.

Each metadata manager of a node controls a given portion of the metadata for the overall cluster. Thus, the metadata stored in a given node comprises a part of a distributed database (of metadata), with the database being theoretically distributed evenly among all (or a given subset of) nodes in the cluster. The metadata managers cooperate to achieve this function, as has been described. When new nodes are added to the cluster, individual node responsibilities are adjusted to the new capacity; this includes redistributing metadata across all nodes so that new members assume an equal share. Conversely, when a node fails or is removed from the cluster, other node metadata managers compensate for the reduced capacity by assuming a greater share. To prevent data loss, metadata information preferably is replicated across multiple nodes, where each node is directly responsible for managing some percentage of all cluster metadata, and copies this data to a set number of other nodes.

When a new map is generated, the MM leader initiates a distribution of that map to the other nodes and requests suspension of processing until all nodes have it. Ordinary processing is resumed once the system confirms that all of the nodes have the new map.

Operating with Missing Regions

In the system as described above, the metadata is distributed into regions that are stored redundantly across the nodes in the system. A metadata manager has a region map that contains the locations of these regions, and this enables the system to route requests appropriately. The number of regions determines the granularity at which the metadata load is divided across all the nodes. The map contains copies of the regions in the following states: authoritative region copies (A regions), backup region copies (B regions), and incomplete region copies which are in the process of being restored from scratch or from an (A) or (B) region (I regions). The map may also include "partial" region copies which are former A or B regions in the process of being restored (P regions).

When all nodes are running and all storage is available in the cluster for each region, there is one (A) copy, and MDPL-1 (B) copies. If an outage in the cluster occurs that causes a region's (A) copy to be lost, the map is reconstructed and an existing (B) copy is promoted to the new (A) copy. When additional outages occur, it is possible that a region's (B) copy is also lost, leaving no region copy to promote. When all A and B copies are lost, the region is considered missing, and data managed by that region becomes inaccessible.

Thus, clusters undergoing multi-node outages present availability concerns. A multi-node outage can result in a cluster that is above quorum but is missing metadata for one or more regions. According to the disclosure herein, the cluster is operated with one or missing regions instead of merely being unavailable while the metadata outage is repaired. As will be described, this feature places the cluster in an effective read-only state, ensuring a level of at least partial availability until the missing metadata is brought back online. While regions that are missing are still unavailable during this time (and while client requests for files and directories managed by these regions will not succeed), the cluster remains up and read requests to other regions will succeed.

The feature disclosed herein of operating with missing database regions significantly enhances the use-ability of the distributed object storage system undergoing a multi-node outage.

In the prior art, when regions are missing, the cluster typically is inaccessible. FIG. 7 is a table that illustrates an 8 node cluster with MDPL=2 when two nodes become unavailable prior to the teachings herein. In this example, one node becomes unavailable, and then another node becomes unavailable before the first node has been repaired. In this case, any region shared between the two downed nodes is now missing (i.e., there is no authoritative or backup region available). In this case, the cluster may be above quorum but still unusable. FIG. 8 illustrates the impact of a double node failure on the cluster described in the table of FIG. 7. The drawing illustrates the status of each node in the cluster temporally, moving left to right. As seen in FIG. 8, the left side of the diagram shows the cluster at a first point-in-time being fully operational with backups. The middle portion of the diagram shows what happens at a second point-in-time when node 4 is lost (a single node failure). In this scenario, representative (A) regions 3/06 and 3/07 are lost, as is (B) region 3/05. At the second point-in-time, recovery has begun with (B) copies (3/06 on node 1 and 3/07 on node 3) promoted to (A) and (I) regions (on node 2) started to replace the (B) region that has been promoted. The right side of the diagram illustrates a third (subsequent) point-in-time when there has been a second node failure (namely, node 3) while the repair (on the node that went down previously) has not yet completed. At this point regions 3/05 and 3/07 are totally lost; in the prior art, the storage system is now unavailable to clients.

The "operate with missing region" feature of this disclosure allows the cluster to continue servicing reads for available regions even when some regions are missing. According to this disclosure, the cluster is placed in an effective read-only mode for all regions. As used herein, "read-only" means that no client write or update requests will succeed while the cluster is in this state. In particular, those requests should fail with an error message (or the like) that indicates failure because of the read-only status. Preferably, such requests are then re-tried. In this mode, all regions are only allowed to perform read operations. In addition, error messages and/or alerts are generated to notify administrative personnel when the cluster goes into this mode.

According to the teachings here, the cluster continues to operate with missing regions by entering a read-only state, and by indicating missing regions on the region map. The cluster then automatically recovers returning missing region(s), after which is leaves the read-only state.

The read-only state works as follows, with reference also to the process diagram in FIG. 10. When it is detected at step 1000 that an (A) region copy is lost and at least one (B) region copy to promote cannot be found, a proxy for that region's (A) copy is created at step 1002. When the proxy is created, a read-only flag on the region map is set at step 1003. At step 1004, an entry in the region map indicating the missing region is made. Then, when it is determined at step 1006 that a request is made on that region, a response to the request is issued at step 1008 by one or more of the remaining nodes (since the missing region itself cannot respond). The response preferably is an error message (or the like) that denotes that the region is missing. When the proxy is created, a read-only flag on the region map is set. As a result, the cluster is now in a read-only mode in which it continues to answer incoming client requests but returns an error for any client write request that is associated with the portion of the cluster that is impacted by the outage. The cluster continues to service write requests, such as where the request is on data that is accessed in aggregate rather than individually. When a write request is made, the system looks at the request type and passes through those it can process.

Figure 10:
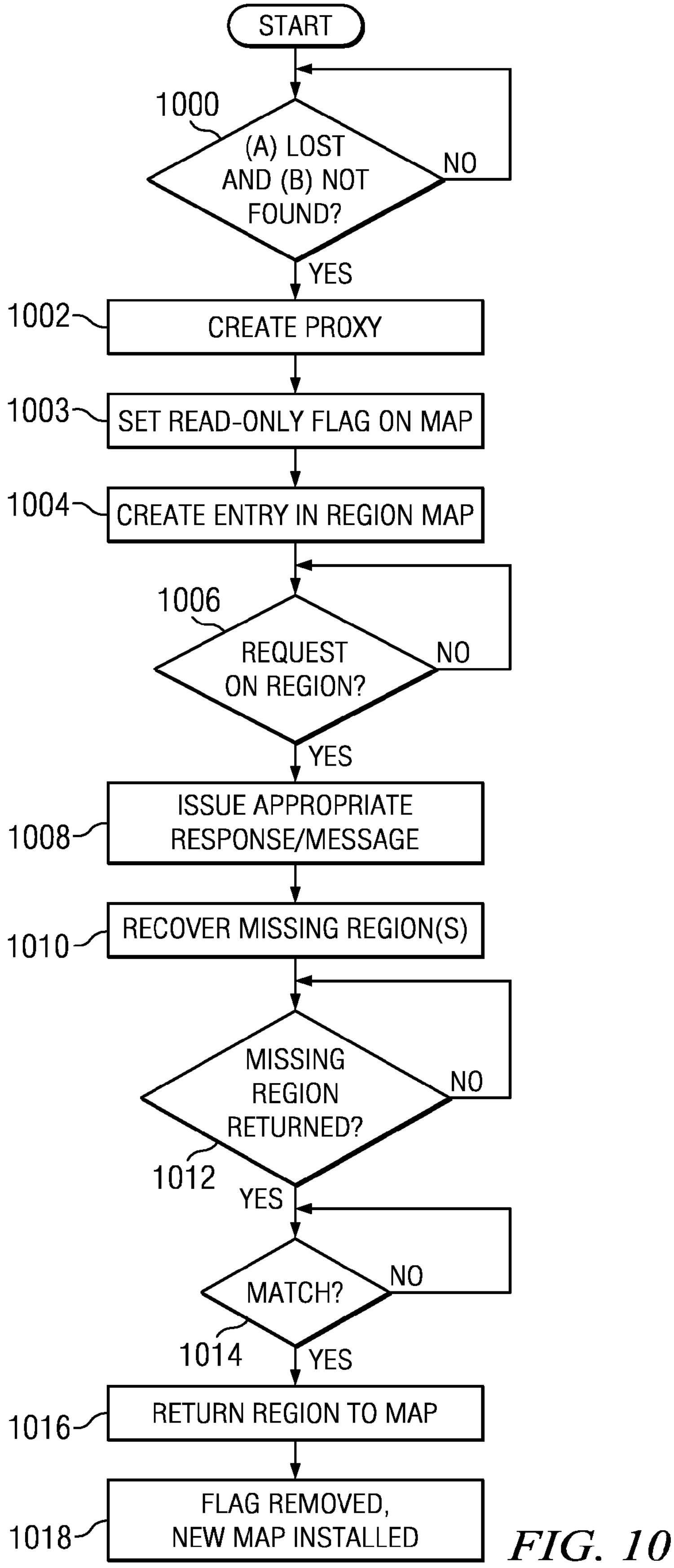
FIG. 10 is a process flow diagram illustrating the high level steps of the operating with missing regions technique of this disclosure.

The above-described sequence of steps in FIG. 10 may be varied.

The functions as described in the previous paragraph preferably are implemented in a "create authoritative region" method that ensures that every region has an authoritative (A) copy by promoting some (B) backup copy. For regions that do not have a valid (B) copy (such as in the double node failure examples above), the method is used to mark the map as read-only and creates a dummy (A) copy (i.e., the "proxy") with no owner. The read-only state is then entered, as has been described. This method also makes sure that any regions that have an (I) copying from another node have the (I)'s copy source promoted as the (A). Also, the method tries to preserve the (A) assignments from the last map if it is not prevented from doing so. This method replaces the map transformation (1) of the map calculation described above.

After the proxy region has been created in this manner, the system installs a new read-only map. Referring back to FIG. 10, the system continues to automatically recover the missing regions while in this state as indicated at step 1010. For a missing region, the last map version with a valid copy of that region remains stored in the map. When that missing region is returned as determined by step 1012, the system determines at step 1014 whether the last map that region thinks it was in matches the one stored; if it does, the system returns that region to the map at step 1016. The read-only flag is then removed and a new map is installed at step 1018. The system also handles saving missing regions that return but that fail to be recovered (e.g., due to the region being obsolete) so that the system does not lose potentially the only copy of that region's metadata. The map keeps an entry for this unrecovered missing region until either manually removed or superseded by a current working version copy.

To avoid entering a read-only state unnecessarily while a map is being reconstructed (e.g., during a cluster boot), preferably the system imposes an interruptible delay that pauses map installation if missing regions are detected. This process is interrupted by other events, such as a node coming back up so that the new map process is not stalled.

While in the read-only state, preferably the Web interface displays to the administrator that the cluster is in read-only mode. Cluster statistics may not be available during this time, and preferably other policies and services are suspended when a map is read-only.

FIG. 9 is a table that illustrates an 8 node cluster with MDPL=2 when two nodes are lost but with the enhanced availability feature of this disclosure. FIG. 11 illustrates the impact of the double node failure on the cluster described in the table of FIG. 9 but shows how the storage system continues to honor read requests outside the missing regions according to the teachings herein. FIG. 11, like FIG. 8, shows the 8 node cluster in three point-in-time states, from left to right. On the left side, the cluster is fully operational. At a second point-in-time, represented in the middle of the drawing, node 4 has been lost. As shown, the (A) regions 3/06 and 3/07 are lost, as is (B) region 3/05, and recovery has begun with (B) copies promoted to (A) and incomplete copies (I) started to replace the (B) copies that were promoted. At the third point-in-time, as represented on the right portion, node 3 has failed. There is now a double node failure as recover of node 4 has not yet completed. In this example, as compared to FIG. 8, the storage system returns an error for read requests on those regions that are lost, stops accepting write requests, but still honors read requests outside the missing regions.

When the cluster is operating normally, all region requests are serialized through the (A) region. The region typically executes a request runner process that determines, for each request, if the request can run in a shared mode (reads) or an exclusive mode (writes). This is determined by a flag in the request itself. To enforce read-only behavior such as described above, the request runner process detects that the cluster is in read-only mode and then enforces the above-described read-only semantics on user (i.e., non-admin log) requests. Admin log write requests typically are permitted. Additionally, preferably several distinct error states are distinguished: reads from a missing region, writes to a missing region, and writes to a read-only non-missing region. Another possible error message is a "partial results." In particular, in a situation where a request would normally gather data from the entire cluster (e.g., collecting cluster-wide metrics), the system allows the request to be processed on those non-missing regions but indicates that not all regions were available to process the request. This is a "partial result" message. In this way, the client can decide whether to reject the partial results or use them depending on their particular needs. Preferably, all such errors are re-tried to ensure that requests do not fail due to transient node outages (such as a cluster reboot).

The system includes create (A) region method that ensures that every region has an authoritative (A) copy by promoting some (B) backup copy. For regions that do not have a valid (B) copy (such as in the double node failure examples above), the method is used to mark the map as read-only and creates a dummy (A) copy with no owner. The read-only state is then entered, as has been described.

In this manner, the cluster operates with at least partial availability until the missing metadata is brought back. Thus, overall the technique described herein increases cluster availability in the face of adverse events, and it reduces the time during which the cluster is below MDPL.

An archive management solution such as described herein enables capture, preservation, management, and retrieval of digital assets. The design addresses numerous requirements: unlimited storage, high reliability, self-management, regulatory compliance, hardware independence, and ease of integration with existing applications.

Clusters of commodity hardware running Linux (for example) provide a robust platform and a virtually unlimited archive. The system can scale, e.g., from a few storage node servers to many nodes that store thousands of terabytes of data. The architecture ensures that storage capacity can always keep pace with an organization's increasing archive requirements.

The system is designed never to lose a file. It replicates data across the cluster so that the archive is always protected from device failure. If a disk or node fails, the cluster automatically fails over to other nodes in the cluster that maintain replicas of the same data.

The system reduces the cost of archive storage through autonomous processing. For example, as nodes join or leave the clustered archive, the system automatically adjusts the cluster's load balance and optimizes performance by redistributing files across member nodes.

The system facilitates compliance with customer-defined retention policies.

The system eliminates hardware dependencies by deploying on an open platform. As the cost gap between commodity platforms and proprietary storage devices grows, IT buyers no longer want to be locked into relationships with high-cost appliance vendors. Because a given node typically runs on commodity hardware and preferably open source (e.g., Linux) operating system software, preferably buyers can shop among many hardware options for the best solution.

The system also offers industry-standard interfaces such as NFS, HTTP, FTP, and CIFS to store and retrieve files. This ensures that the system can easily interface to most standard content management systems, search systems, storage management tools (such as HSM and backup systems), as well as customized archive applications.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed technique has been described in the context of a method or process, the subject matter herein also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Although the present invention has been described in the context of an archive for "fixed content," this is not a limitation either. The techniques described herein may be applied equally to storage systems that allow append and replace type modifications to the content.

The examples above illustrating how the read-only state is entered upon a double multi-node failure are merely representative.

Having described our invention, what we now claim is as follows.

What is claimed is:

1. A method comprising:

distributing, to at least one node of a plurality of nodes, by one or more processors of a computer system including the plurality of nodes, a first region copy of a first region, wherein the first region is included in a set of regions distributed across the plurality of nodes, wherein metadata objects are stored in the set of regions distributed across the plurality of nodes, wherein the metadata objects include information about content data stored by the computing system, wherein the first region copy is designated to receive requests to the first region in the set of regions;

distributing, to at least one other node of the plurality of nodes, a second region copy of the first region, the second region copy being configured to be synchronized with the first region copy;

distributing, across the plurality of nodes, region maps identifying the set of regions among the plurality of nodes;

based at least in part on failure of the first region copy and the second region copy being unavailable, entering a read-only state for the set of regions distributed across the plurality of nodes; and indicating, in the region maps, a missing region, the missing region corresponding to the first region for which the first region copy has failed and the second region copy is unavailable.

2. The method as recited in claim 1, wherein the second region copy is configured to serve in placed of the first region copy if the first region copy fails and the second region copy is available.

3. The method as recited in claim 1, further comprising: creating, in association with the read-only state, a proxy copy of the first region; and
during the read-only state, restricting client write or update requests until leaving the read-only state following recovery of the first region.

4. The method as recited in claim 1, further comprising: during the read-only state, returning an error for a read request to the first region corresponding to the first region copy that has failed; and
processing a read request directed to a region in the set of regions other than the first region.

5. The method as recited in claim 1, further comprising: recovering the first region corresponding to the first region copy that has failed; and
leaving the read-only state following recovery of the first region.

6. A computer system comprising:
a plurality of nodes, wherein metadata objects are stored in a set of regions distributed across the plurality of nodes, wherein the metadata objects include information about content data stored by the plurality of nodes;
a first region copy distributed to a first node in the plurality of nodes, the first region copy being configured to receive requests to a first region in the set of regions;
a second region copy of the first region, wherein the second region copy is distributed to a second node in the plurality of nodes, the second region copy being configured to synchronize with the first region copy;
region maps identifying the set of regions among the plurality of nodes, where the region maps are distributed across the plurality of nodes, wherein:
based at least in part on failure of the first region copy and the second region copy being unavailable, the set of regions distributed across the plurality of nodes is configured to operate in a read-only state; and
a missing region indicated in the region maps, the missing region corresponding to the first region for which the first region copy has failed and the second region copy is unavailable.

7. The computer system as recited in claim 6, wherein the second region copy is configured to serve in place of the first region copy if the first region copy fails and the second region copy is available.

8. The computer system as recited in claim 6, further comprising a proxy region copy created in association with the read-only state; and
wherein, during the read-only state, client write or update requests are restricted until leaving the read-only state following recovery of the first region.

9. The computer system as recited in claim 6, wherein, during the read-only state, an error is returned for a read request to the first region copy; and
a read request directed to a region other than the first region in the set of regions is processed.

10. The computer system as recited in claim 6, wherein, during the read-only state, at least one node, other than the first node that supports the failed first region copy, responds to a client request.

11. The computer system as recited in claim 6, wherein, following recovery of the first region, the set of regions are configured to leave the read-only state.

12. A non-transitory computer-readable medium having stored thereon instructions that, when executed by one or more processors, program the one or more processors to:
distribute, to a first node of a plurality of nodes, a first region copy of a first region, wherein the first region is included in a set of regions distributed across the plurality of nodes, wherein metadata objects are stored in the set of regions distributed across the plurality of nodes, wherein the metadata objects include information about content data stored by the plurality of nodes, wherein the first region copy is designated to receive requests to the first region in the set of regions;
distribute, to a second node of the plurality of nodes, a second region copy of the first region, the second region copy being configured to be synchronized with the first region copy;
distribute, across the plurality of nodes, region maps identifying the set of regions among the plurality of nodes;
based at least in part on failure of the first region copy and the second region copy being unavailable, enter a read-only state for the set of regions distributed across the plurality of nodes; and
indicate, in the region maps, a missing region, the missing region corresponding to the first region for which the first region copy has failed and the second region copy is unavailable.

13. The non-transitory computer-readable medium as recited in claim 12, wherein the second region copy is configured to serve in placed of the first region copy if the first region copy fails and the second region copy is available.

14. The non-transitory computer-readable medium as recited in claim 12, wherein the one or more processors are further programmed to:
create, in association with the read-only state, a proxy copy of the first region; and
during the read-only state, restrict client write or update requests until leaving the read-only state following recovery of the first region.

15. The non-transitory computer-readable medium as recited in claim 12, wherein the one or more processors are further programmed to:
during the read-only state, return an error for a read request to the first region corresponding to the first region copy that has failed; and
process a read request directed to a region in the set of regions other than the first region.

16. The non-transitory computer-readable medium as recited in claim 12, wherein the one or more processors are further programmed to:
recover the first region corresponding to the first region copy that has failed; and
leave the read-only state following recovery of the first region.

17. The non-transitory computer-readable medium as recited in claim 12, wherein the one or more processors are further programmed to:
create, for each region in the set of regions, a respective first region copy as an authoritative region copy, and zero or more respective second region copies as backup copies of the respective first region copy, wherein a number of respective backup copies is set according to a metadata protection level for each region.

* * * * *